United States Patent [19]

Kim

[11] Patent Number: 5,764,618
[45] Date of Patent: Jun. 9, 1998

[54] PICKUP ADJUSTING DEVICE IN AN OPTICAL DISK PLAYER

[75] Inventor: Sang-tae Kim, Suwon, Rep. of Korea

[73] Assignee: Samsung Electronics Co., Ltd., Kyungki-do, Rep. of Korea

[21] Appl. No.: 673,047

[22] Filed: Jul. 1, 1996

[30] Foreign Application Priority Data

Jun. 19, 1996 [KR] Rep. of Korea ............ 96-22242

[51] Int. Cl.⁶ .................................. G11B 17/30
[52] U.S. Cl. ................................ 369/219; 369/215
[58] Field of Search .................. 369/215, 219, 369/220, 221, 244; 360/106, 105

[56] References Cited

U.S. PATENT DOCUMENTS

| | | | |
|---|---|---|---|
| 5,111,088 | 5/1992 | Fujino | 369/219 |
| 5,189,660 | 2/1993 | Caldwell | 369/219 |
| 5,615,204 | 3/1997 | Watanabe et al. | 369/219 |

*Primary Examiner*—Allen Cao
*Attorney, Agent, or Firm*—Sughrue, Mion, Zinn, Macpeak & Seas, PLLC

[57] ABSTRACT

A pickup adjusting device of an optical disk player, having an adjusting device which is installed on at least one end of a pair of guide shafts which guide the movement of a pickup installed on the deck. The adjusting device lifts or lowers the end of the guide shafts to allow the pickup position to be adjusted to compensate for inclination errors.

8 Claims, 3 Drawing Sheets

PICKUP ADJUSTING DEVICE IN AN OPTICAL DISK PLAYER

BACKGROUND OF THE INVENTION

1. Field of the Invention

The present invention relates to a pickup adjusting device in an optical disk player, and more particularly, to a pickup adjusting device which adjusts the inclination of a pickup to compensate for inclination errors by lifting or lowering at least one end of the guide shafts which guide the pickup.

2. Description of the Related Art

In a typical optical disk player, such as a compact disk player (CDP), a laser disk player (LDP) or a digital video disk player (CVDP), a precise pickup and deck mechanism are required for reading information stored on a high density disk or writing information to such a disk. FIG. 1 is a schematic view of the pickup portion of a conventional optical disk player. As shown in FIG. 1, guide shafts 1 are installed on a deck 2 by fixing portions 3. A pickup 4 is slidably installed on the guide shafts 1. Also, a rack portion (not shown) engaged with a screw 5 is formed at one side of the pickup 4. When the screw 5 rotates in response to the driving power of a motor 6, the pickup 4 moves along the guide shafts 1 and reads information from a disk (not shown) loaded on a turntable 7.

When reading information from the disk, the laser beam emitted from the pickup 4 should be perpendicularly incident onto a desired position on the disk. However, pickup errors, such as a focusing error or an inclination error of the beam from the disk, sometimes occur. A focusing error occurs when the laser beam does not appropriately converge on the disk due to variation in the distance between the disk and the pickup 4. An inclination error occurs when the pickup 4 is inclined with respect to the disk in a radial direction or a tangential direction of the disk. Such errors can be compensated for by the focusing and tracking servo mechanism of the pickup 4, but only to a limited degree since the guide shafts 1 which support the pickup 4 are fixedly attached to the deck 2 by the fixing portions 3. Thus, complete compensation for errors may not be possible. Also, the problem becomes more severe when reading information from a high density recording medium such as a digital video disk (DVD) which simultaneously stores audio and video data.

SUMMARY OF THE INVENTION

It is an object of the present invention to provide a pickup adjusting device of an optical disk player which can compensate for inclination errors by changing the position of the guide shaft which guides the movement of the pickup.

To achieve the above object, there is provided a pickup adjusting device of an optical disk player, having an adjusting means installed at least at one end of one of a pair of guide shafts which guide the movement of a pickup. The adjusting means lifts or lowers the ends of the guide shafts with respect to a deck.

The adjusting means comprises a lower cam portion rotatably installed on the deck and having a spiraling first cam surface on the upper surface thereof and an upper cam portion which is coupled to the lower cam portion. The upper cam portion has a second cam surface corresponding to the first cam surface. The ends of the guide shafts are clamped between the first and the second cam surfaces.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

Figure 1:
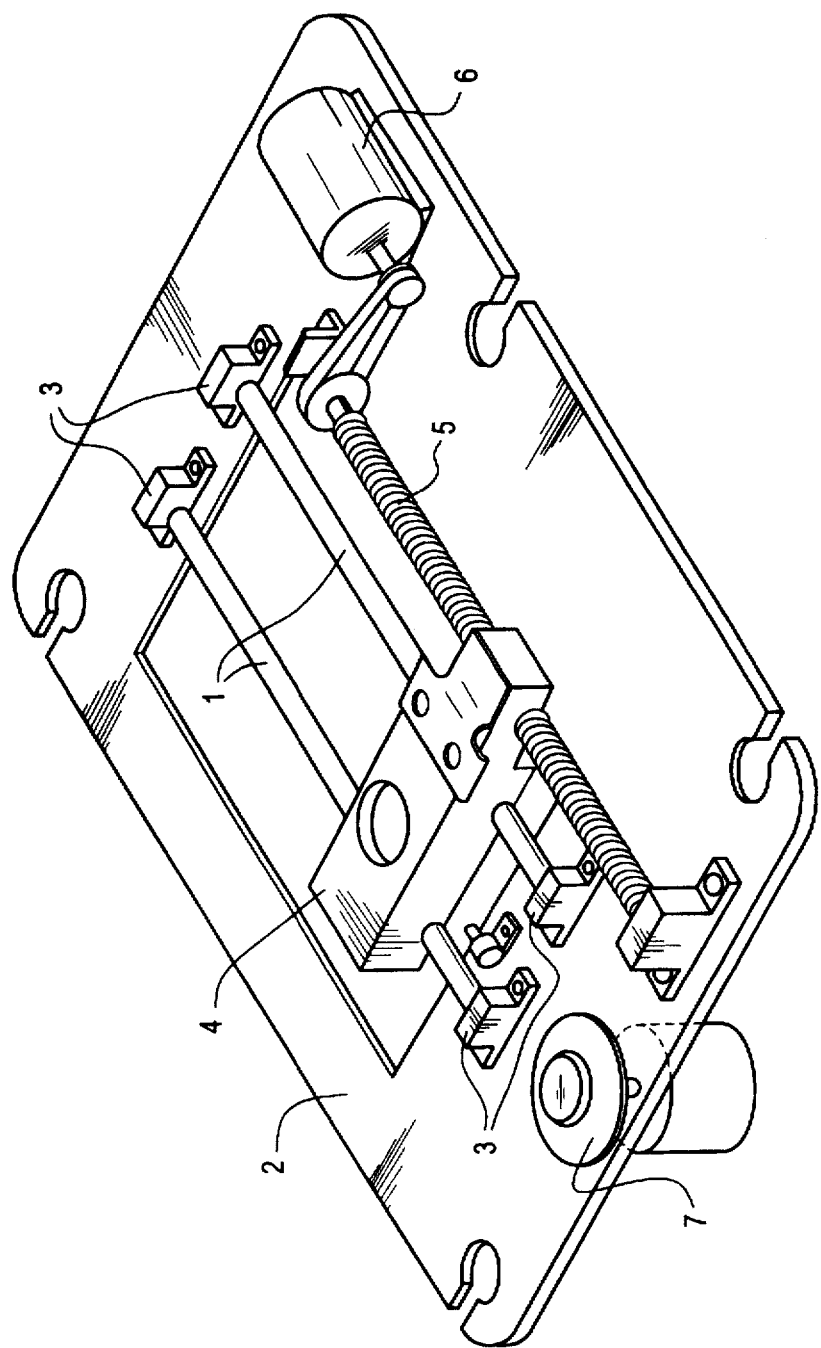
FIG. 1 is a perspective view showing a portion of a conventional optical disk player.
Figure 2:
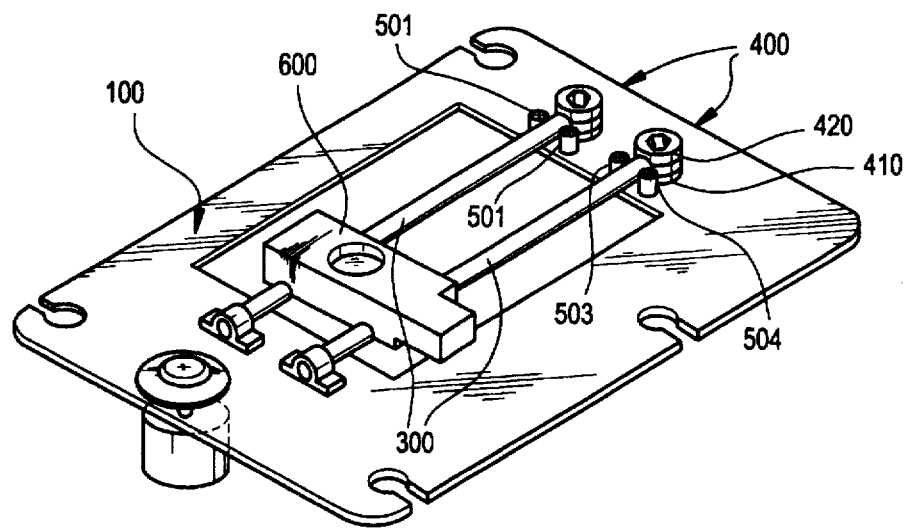
FIG. 2 is a perspective view showing the pickup adjusting device according to a preferred embodiment of the present invention.

FIG. 2 illustrates a portion of an optical disk player having a pickup adjusting device according to the preferred embodiment of the present invention. As shown in FIG. 2, an optical disk player includes adjusting means 400 which lifts or lowers at least one end of at least one of a pair of guide shafts 300 which guide the movement of a pickup 600. The adjusting means 400 includes a lower cam portion 410 rotatably installed on a deck 100 and an upper cam portion 420 attached to the upper portion of the lower cam portion 410. Supporting members 501, 502, 503, and 504 support the guide shafts 300.

Figure 3:
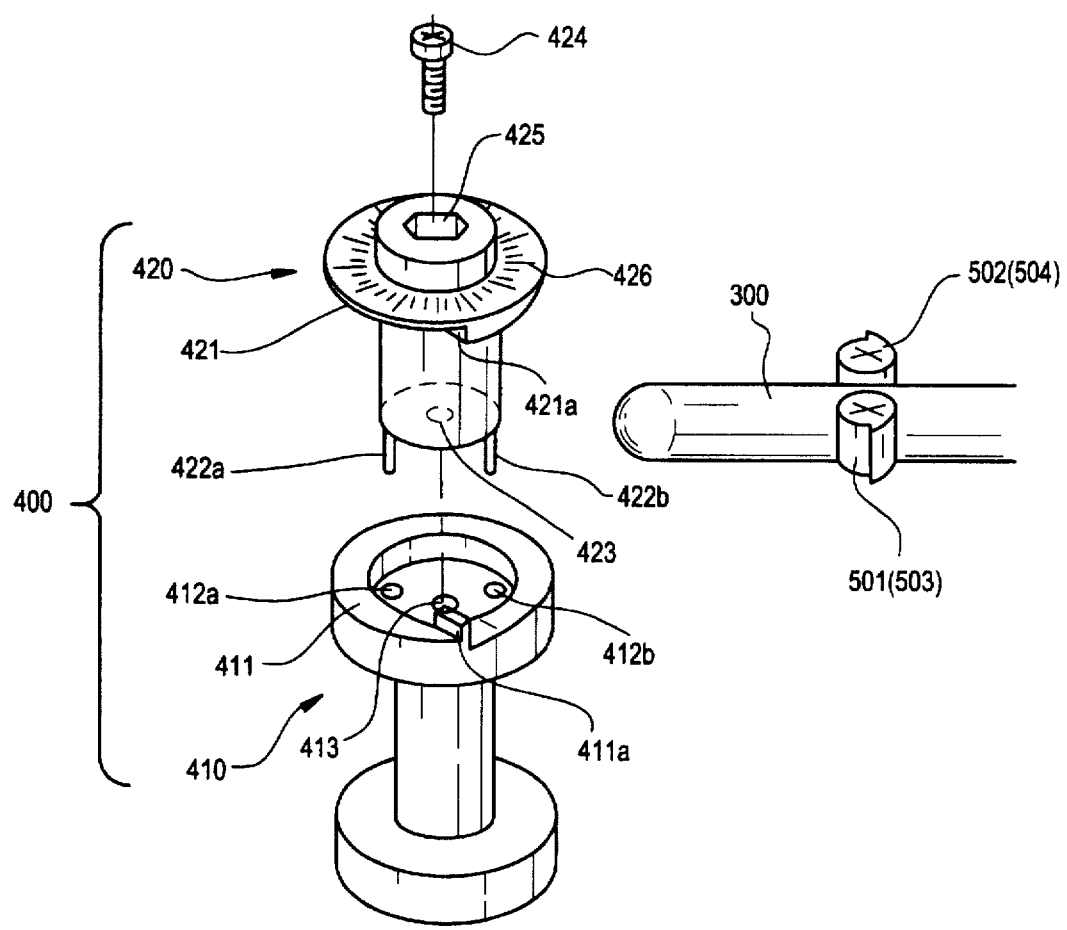
FIG. 3 is an exploded perspective view of the pickup adjusting device according to the preferred embodiment.

A detailed structure of the adjusting means 400 is shown in FIG. 3. The lower cam portion 410 has a helicline-shaped (i.e. upward/downward spiral) first cam surface 411 formed on the upper surface thereof. The upper cam portion 420 has a second cam surface 421, which corresponds in shape with the first cam surface, 411' formed on the lower surface thereof. The lower cam portion 410 is installed on a deck 100 (FIG. 2) in a rotatable manner. The upper cam portion 420 is attached to the lower cam portion 410 by inserting combining projections 422a and 422b formed on the lower portion of the upper cam portion into combining holes 412a and 412b formed in the lower cam portion 410. The end portion of the guide shaft 300 is inserted between the first cam surface 411 of the lower cam portion 410 and the second cam surface 421 of the upper cam portion 420. The upper and the lower cam portions 420 and 410 are combined by a screw 424 inserted in screw holes 413 and 423 and threadably engaged with an inner surface of screw hole 413.

Figure 5:
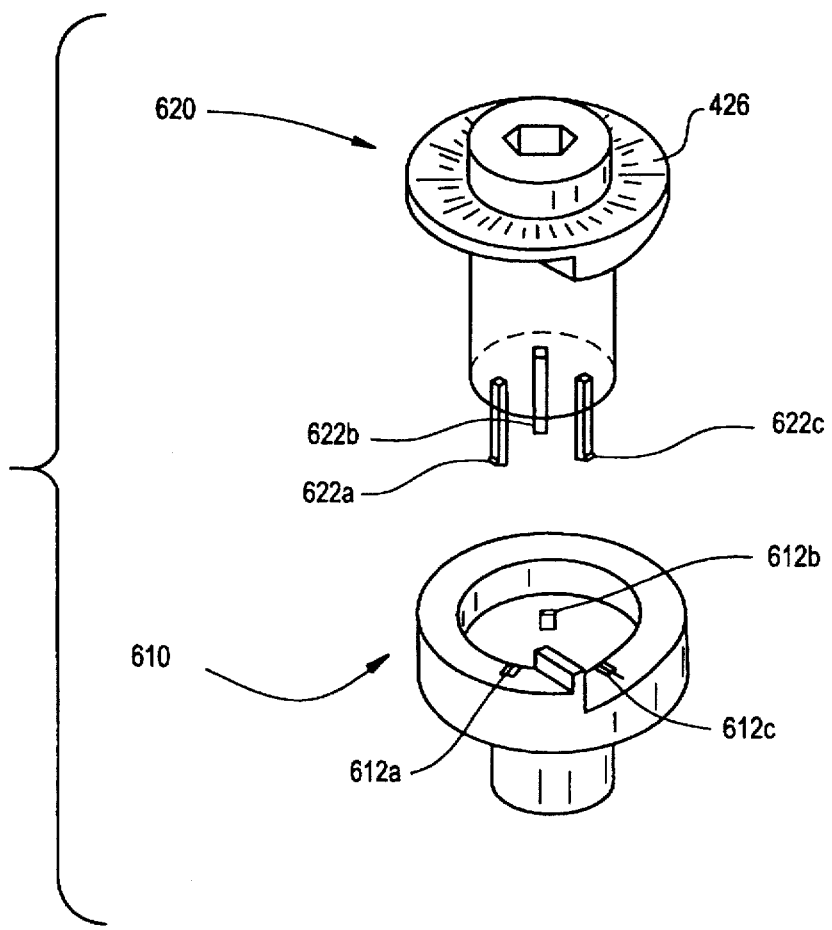
FIG. 5 is an exploded perspective view showing another preferred embodiment of the pickup adjusting device according to the present invention.

In another embodiment, as shown in FIG. 5, an upper cam portion 620 is attached to a lower cam portion 610 by inserting locking members 622a, 622b, and 622c formed at the lower portion thereof into locking holes 612a, 612b, and 612c of the lower cam portion 610.

Figure 4:
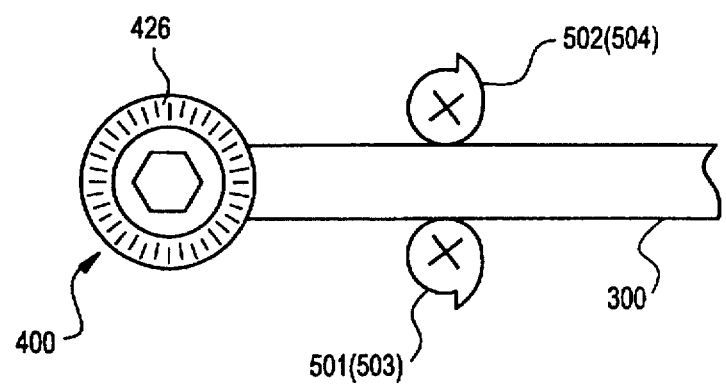
FIG. 4 is a plan view showing the pickup adjusting device according to the preferred embodiment.

Referring again to FIG. 3, a nut groove 425 for rotating the upper cam portion 420 is formed on the upper cam portion 420. The nut groove 425 is preferably formed as a hexagonal hole. A plurality of supporting members 501, 502, 503, and 504 are rotatably installed on the deck 100 (FIG. 2) to support the guide shafts 300 at both sides of the guide shafts 300. Also, the supporting members 501, 502, 503, and 504 each having a cam surface formed on the circumference thereof, as shown in FIG. 4, can be rotated to shift the guide shafts 300 to the right or left (up or down in FIG. 4), if required.

A stepped portion 421a formed on the second cam surface 421 of the upper cam portion 420 engages with a stopper portion 411a formed on the first cam surface 411 of the lower cam portion 410. The stepped portion 421a, when in contact with the stopper portion 411a, determines the initial relative positions of the upper and the lower cam portions 420 and 410.

In the pickup adjusting device according to the present invention having the structure described above, a predetermined tool such as an Allen wrench is inserted into the hexagonal groove 425 and the upper cam portion 420 is rotated to adjust the incline of the guide shaft 300. Accordingly, the lower cam portion 410 combined with the upper cam portion 420 rotates by virtue of the protrusions 422a and 422b being inserted in the combining holes 412a and 412b. Therefore, the ends of the guide shafts 300, clamped between the first cam surface 411 of the lower cam portion 410 and the second cam surface 421 of the upper cam portion 420, ascend and descend with respect to the deck 100, sliding along the first and the second cam surfaces 411 and 421. Such perpendicular movements (i.e. towards and away from the deck) of the guide shafts 300 can compensate for inclination errors by changing the position of the pickup 600 (FIG. 2). Friction between the lower cam portion 410 and the deck prevent arbitrary movement of the pickup adjusting device.

Meanwhile, the supporting members 501, 502, 503, and 504 prevent the guide shafts 300 from moving laterally. Further, when moving the guide shafts 300 by rotating the upper and the lower cam portions 420 and 410, the supporting members 501, 502, 503, and 504 are rotated to a position in which the guide shafts 300 are held loosely therebetween. After completing the movement of the guide shafts 300, the supporting members 501, 502, 503, and 504 are rotated to firmly clamp the guide shafts 300 by having the cam surfaces (see FIG. 4) thereof contact both sides of the guide shafts 300.

Also, as shown in FIGS. 3 through 5, divisions 426 are marked on the upper cam portion 420 to indicate the degree of rotation of the upper cam portion 420 with respect to any fixed marker, thereby showing the degree of lifting and lowering of the guide shafts 300 clamped between the upper and lower cam portions 420 and 410.

As described, the pickup adjusting device according to the present invention compensates for inclination errors by making minute positional adjustments to the guide shafts and pickup, thereby improving the pickup characteristics of the disk player. The positional adjustments can be effected manually, while observing a measuring device. Alternatively, the adjustments can be made automatically by known actuators, such as motors, controlled by a known control device.

The present invention is not restricted to the above embodiments, and it is clearly understood that many variations can be made within the scope and spirit of the present invention as defined by the appended claims.

What is claimed is:

1. A pickup adjusting device of an optical disk player, comprising:

a pair of guide shafts for guiding the movement of a pickup, said guide shafts being installed on a deck; and an adjusting device which lifts and lowers at least one of said guide shafts, said adjusting device being installed at at least one end of said at least one of said guide shafts, wherein said adjusting device comprises:

a lower cam portion rotatably installed on said deck and having a helicline-shaped first cam surface on the upper surface of said lower cam portion; and an upper cam portion which is coupled with said lower cam portion, said upper cam portion having a second cam surface which corresponds in shape to said first cam surface, an end of said at least one of said guide shafts being clamped between said first and second cam surfaces.

2. The pickup adjusting device of an optical disk player as claimed in claim 1, further comprising a plurality of supporting members which are rotatably installed on the deck to support both sides of said at least one guide shaft.

3. The pickup adjusting device of an optical disk player as claimed in claim 2, wherein said supporting members are cylindrically shaped and have a predetermined cam surface formed on the circumferences of said supporting members.

4. The pickup adjusting device of an optical disk player as claimed in claim 1, wherein a stepped portion is formed on one of said first and second cam surfaces and a stopper portion with which the said stepped portion engages is formed on the other of said first and second cam surfaces.

5. The pickup adjusting device of an optical disk player as claimed in claim 1, wherein one of said upper and lower cam portions has protrusions and the other of said upper and lower cam portions has combining holes into which said protrusions are inserted, said upper and lower cam portions being coupled to one another by a screw.

6. The pickup adjusting device of an optical disk player as claimed in claim 1, wherein one of said upper and lower cam portions has locking members and the other of said upper and lower cam portions has locking holes to which said locking members are engaged.

7. The pickup adjusting device of an optical disk player as claimed in claim 1, wherein a nut groove for receiving a tool used to rotate said upper cam portion is formed on the upper surface of said upper cam portion.

8. The pickup adjusting device of an optical disk player as claimed in claim 1, wherein divisions are marked on said upper cam portion to show the degree of rotation of said upper cam portion.

* * * * *